United States Patent [19]

Kaufmann

[11] 3,832,871
[45] Sept. 3, 1974

[54] LOCKING BICYCLE SECURING DEVICE

[76] Inventor: Edward A. Kaufmann, 2785 N. Speer Blvd., Denver, Colo. 80211

[22] Filed: Sept. 4, 1973

[21] Appl. No.: 393,828

Related U.S. Application Data

[63] Continuation-in-part of Ser. No. 349,489, April 9, 1973.

[52] U.S. Cl. .................................. 70/227, 70/234
[51] Int. Cl. ....................... B62h 5/16, E05b 71/00
[58] Field of Search ............ 70/225, 226, 227, 233, 70/234; 211/5

[56] References Cited
UNITED STATES PATENTS

| | | | |
|---|---|---|---|
| 584,017 | 6/1897 | Sewell | 70/226 |
| 2,118,126 | 5/1938 | Wise | 70/234 |
| 2,140,489 | 12/1938 | Wise | 70/227 |
| 2,180,117 | 11/1939 | Lipsis | 70/236 |
| 2,406,257 | 8/1946 | Romero | 70/227 |
| 3,101,695 | 8/1963 | Honeyman | 114/230 |

FOREIGN PATENTS OR APPLICATIONS

| | | | |
|---|---|---|---|
| 132,445 | 7/1902 | Germany | 70/233 |
| 173,940 | 1/1922 | Great Britain | 70/227 |
| 1,050,698 | 1/1954 | France | 70/58 |

*Primary Examiner*—Albert G. Craig, Jr.
*Attorney, Agent, or Firm*—Richard D. Law

[57] ABSTRACT

A bicycle securing assembly including an elongated single support member elevated from the ground and having at least one attachment loop secured to said member. A lockable securing device is attached to a portion of the frame of the bicycle for engaging the attachment loop on said support. The securing device includes a bifurcated member for receiving the attachment loop and lock means securing the loop therein prevents the removal of the bicycle from the support. Elongated rods having a loop or hook formed at one end and a deformed section formed at the opposite end are arranged with the hook portion inserted around the rim and tire of the front and/or rear wheels, with the deformed portion extending into the space between the bifurcated arms to be secured by itself or with the attachment loop. Various locking devices are provided for enclosing the attachment loop and rods within the extended arms of the bifurcated member.

5 Claims, 11 Drawing Figures

LOCKING BICYCLE SECURING DEVICE

This application is a continuation-in-part of my co-pending application for a Bicycle Securing Device, Ser. No. 349,489, filed Apr. 9, 1973.

This invention is directed to a securing device for preventing the unauthorized removal of a bicycle and more specifically is directed to an assembly having a securing device attached to the frame of a bicycle to engage a bicycle support rack and/or wheel securing rods.

As the use of bicycles in both the United States and elsewhere in the world increases, the theft of bicycles, also, has greatly increased. The present conventional bicycle locks include padlocks, cable and locking devices, chain and padlock devices, etc. All of these devices are directed toward the prevention of riding the bicycle when the lock is in place. Normally, these types of devices merely lock one of the wheels of the bicycle to a portion of the frame to immobilize it. In other cases, the chain or cable is interwound through the wheels and frame of the bicycle and is attached to an immovable object to prevent the unauthorized removal of the bicycle.

As is now well known, these types of devices are able to generally discourage the tampering or removal by amateur or juvenile would-be thieves. In the long run, however, these types of devices mean nothing to a professional thief who operates usually with sophisticated metal cutters and vehicles, such as pickup trucks, to rapidly sever the locking device and then remove the bicycle from the so-called secure location. Invariably, they use cutting devices which can easily sever the relatively soft chains or cables that have been used in the past. In addition, the present locking devices fail to discourage the dishonest element in our society from hauling away, where possible, the locked bicycle to a secluded area, where the locking device may be removed in a more leisurely, sophisticated manner, such as with an oxyacetylene cutting torch.

Because of the deficiencies of the common locking devices presently used on bicycles, this invention has as an object to provide a bicycle securing assembly for attaching a bicycle to an anchored support to render it immovable from the support.

Another object of the present invention is to provide a bicycle securing assembly which deters severance of the bicycle from the support by means of ordinary cutting devices which are readily available.

A still further object of the present invention is to provide a bicycle securing assembly which can be readily and economically manufactured and used widespread to reverse the trend in bicycle thefts.

A further object of the present invention is to provide a bicycle securing assembly wherein the bicycle can be easily and quickly attached to or removed from the associated support by the authorized owner. In addition, the present invention provides a bicycle lock which can be easily attached to an existing bicycle or integrally formed as part of the frame of a newly manufactured bicycle.

A further object of the present invention is to provide a bicycle securing assembly wherein the bicycle wheels can be secured to the locking assembly to prevent the wheels from being separately removed from the frame of the bicycle.

A still further object of the present invention is to provide a bicycle locking and securing apparatus which can be cheaply manufactured for sale and use by the younger members of our population which encompasses a large percentage of the present users of bicycles.

Other features and objects of this invention will appear in the following description and appended claims, reference being made to the accompanying drawings forming a part of the specification wherein like reference characters designate corresponding parts in the several views.

Figure 1:
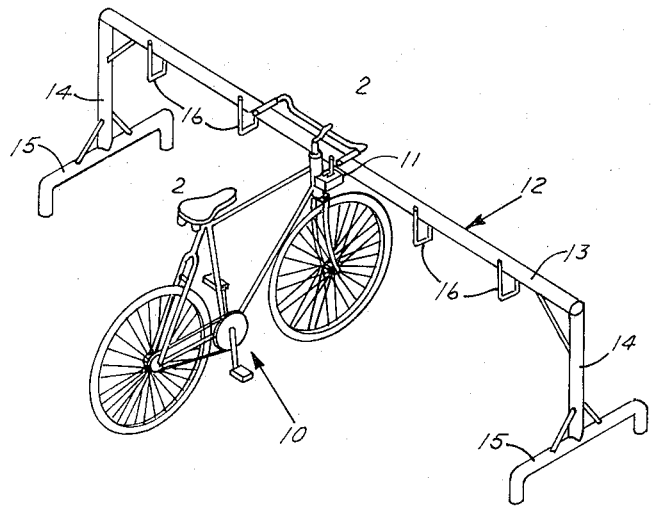
FIG. 1 is an isometric view showing a bicycle securely attached by means of a locking device to an immovable supporting rack, according to the present invention.
Figure 2:
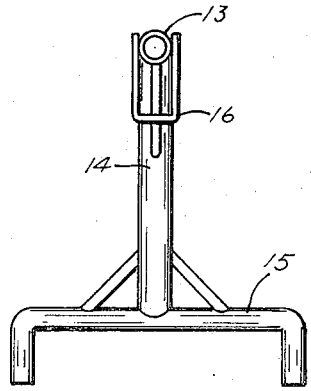
FIG. 2 is a sectional view of the bicycle supporting rack taken along the lines 2—2 of FIG. 1 and showing the support attaching element.
Figure 4:
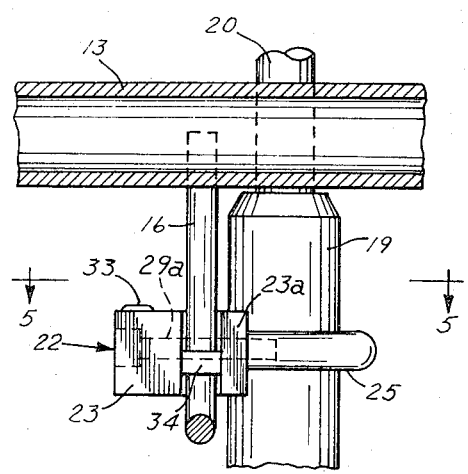
FIG. 4 is a partial sectional view showing the bicycle lock securing assembly in the engaged position taken along the lines 4—4 of FIG. 3.
Figure 3:
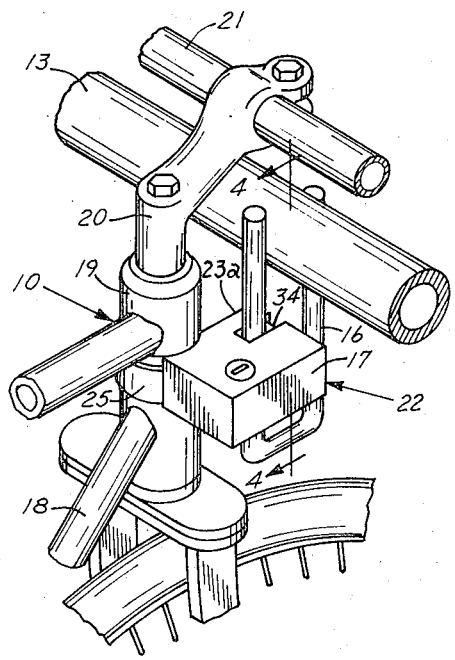
FIG. 3 is an enlarged isometric view showing the bicycle attached locking device securely engaged with the support rack.

Referring more specifically to the drawings, namely FIGS. 1 and 2, a bicycle 10 is shown attached by a locking device 11 to a novel bicycle support rack 12. The rack 12 is formed by a single elongated tube or pipe member 13 having support legs 14. The bottom portion of the legs 14 can be terminated in the form of pedestal 15 or can be extended downwardly into the ground to be buried in a material, such as concrete. If pedestal type legs 15 are to be used, it is an advantage to form the support legs and pedestal legs and possibly the elongated member 13 from solid or filled structural materials to greatly increase the weight of the structure to prevent it from being moved or carried away.

Distributed along the support member 13 in generally even spaced fashion, a plurality of attachment members 16 are suspended downwardly from the support member 13. These attachment members, as can be better seen in FIG. 2, can be arranged in a generally U-shaped configuration from solid or hollow rod stock. In the arrangement shown in FIG. 2, the attachment members are fixedly attached, such as by welding the ends of each of the legs of the attachment members to opposite sides of the support member 13. The height at which the elongated member 13 is horizontally positioned above the supporting ground surface and the length of the attachment members 16 can be arranged to accommodate various sized bicycles. These members may, also, be loose, elongated rings around the elongated member 13. These may serve the same purpose as the members 16, but are more flexible for different types of bicycles and different types of bicycle racks.

It is to be understood that the attachment member may also take various forms, such as a single rod having a bulbous outer end and attached downwardly on the side or undersurface of the supporting member. It is also possible that the attachment members can be formed as an endless ring or closed loops of either flexible or solid material formed around the supporting member which can be fixedly positioned by welding to the upper surface of the member or allowed to slide freely along the member 13. If the latter arrangement is used, it would be desirable to provide stops at each end of the support member 13 to prevent the rings or loops from dropping downwardly over the support legs 13. Whatever the configuration of the anchored attachment member 16, it is necessary that the material from which it is formed be capable of being hardened sufficiently to prevent cutting or severing by means of conventional type cutting devices, such as hacksaws or bolt cutters. Thus, the attachment members should be fabricated from high quality carbon steel or alloys, while the remainder of the support rack can be formed from common materials providing sufficient structural rigidity. It is also to be understood that the attachment members 16 can be anchored or attached to any fixed or rigid object and still be within the scope of this invention.

As part of this invention, a lockable securing device 17 is provided for attachment to a portion of the frame 18 of the bicycle 10. The bearing housing 19 which forms the forward section of the frame 18 and provides support for the fork of the front wheel of the bicycle is a suitable location for attaching the lockable securing device 17. It is, also, possible that the securing device 17 may be attached to or formed as part of a gooseneck 20 to which the handlebars 21 are attached or to other frame members of the bicycle. Attachment of the lockable securing device 17 to the bearing housing 19 is probably more desirable, since it is a rigid part of the entire frame 18 of the bicycle.

The lockable securing device 17 has a bifurcated body 22 with two outwardly extending arms 23 and 23a. An arcuate cut-out 24 is provided on one side of the body 22. The cut-out 24 permits the body 22 to conform to the generally cylindrical configuration of the bearing housing 19.

Figure 5:
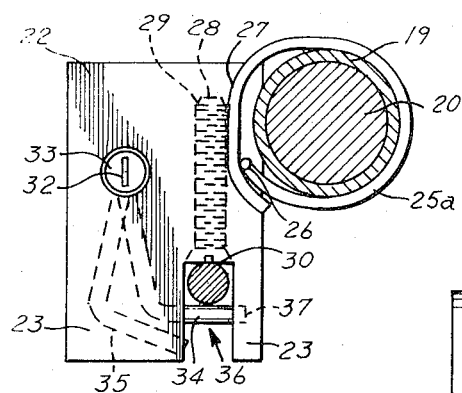
FIG. 5 is a top plan view of the bicycle attached locking device showing the lockable latch mechanism in dashed lines in the open position.
Figure 6:
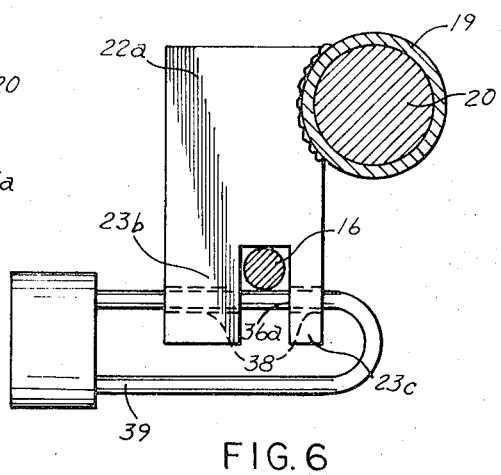
FIG. 6 is another embodiment of the bicycle attached locking device which includes a conventional lock for securing the locking device to the support element.
Figure 7:
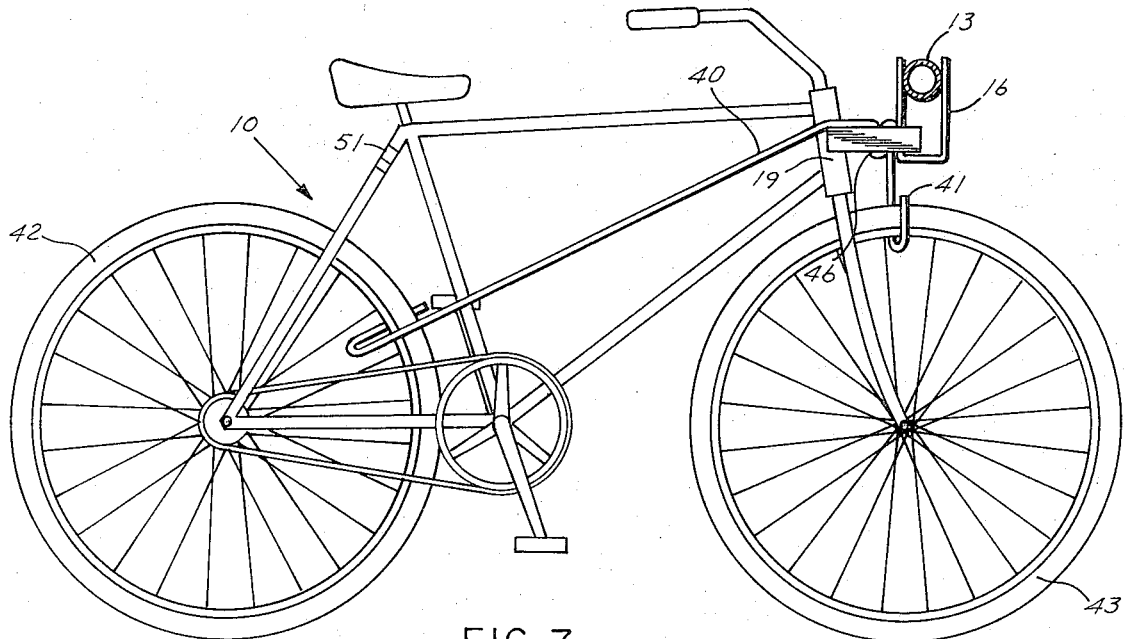
FIG. 7 is a side view of a bicycle having the front and rear wheels secured by means of the securing rods according to this invention.
Figure 8:
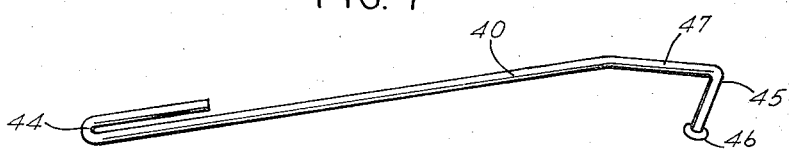
FIG. 8 is an isometric view of the rear wheel securing rod.
Figure 9:
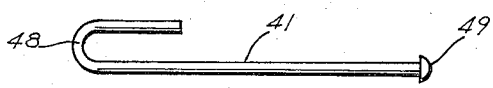
FIG. 9 is a plan view of the front wheel securing rod.

The lockable securing device 17 can be attached to the bearing housing 19 by any suitable method, such as a tightenable rod 25a or strap or other means as shown in FIG. 5, or by welding as shown in FIG. 6, or in the alternative it may be formed as an integral part of the housing which could be cast or forged as a one-piece unit. In the tightenable rod embodiment of FIG. 6, a rod 25a, is secured to the body 22 at one end by means of a pin 26, is arranged to extend outwardly and around the bearing housing 19. The opposite end of the rod 25a is fed through an arcuate slot 27 which is arranged tangent to a bore 28 provided within the body 22. The bore 28 extends inwardly through the body 22 at the base of the arms 23. A rotatable screw 29 having spiral threads engages a series of arcuate cut-outs 31 provided in the rod 25a. By rotating the screw 29 the threads engage the arcuate cut-outs 31 allowing the strap to be tightened around the housing 19 to rigidly secure the lockable securing device 17 to the bicycle frame 18. With the head 30 of the tightening screw 29 located at the base of the outstanding arms 23 the head 30 is concealed to prevent tampering when the securing device 17 is engaged with the attachment member 16. To provide additional strength to the rod 25a the arcuate cut-outs 31 may be omitted in the portion of the strap which is exposed around the outside of the bearing housing 19. In the embodiment of FIG. 5, a V-shaped rod 25 abuts the body 22, and countersunk bolts 29a (of the one way type) secure the body 22 to the member 19. The bolts are, of course, threaded into the ends of the rod 25.

A locking device 32 can be provided within the body to close the slot 36 provided between the arms 23 to retain the attachment member 16 when inserted therebetween. In the embodiment shown in FIG. 5, a tumbler type lock cylinder 33 is mounted within the body 22 for rotatable movement from an open position to a locked position. An L-shaped arm 34 is provided to extend outwardly from the cylindrical lock 33. The end portion 35 of the arm 34 is arranged to extend across the slot 36 provided between the arms 23 and to be inserted into a recess 37 provided in the opposite arm when the lock is in the closed position. When the lock is in the open position the outer end 35 of the L-shaped arm 34 is drawn into the body 22 to clear the slot 36 and permit easy removal or entrance of the attachment member 16. Thus, a simple locking arrangement is provided whereby the attachment member 16 may be securely enclosed within the slot 36 to prevent unauthorized removal of the bicycle 10 from the rack 12.

In another embodiment of this invention, the lockable securing device 17 can be provided as a solid body 22a having outwardly extending spaced arms 23b and 23c forming a slot 36a therebetween. Transversely aligned apertures 38 are provided through the arms 23a near their outer ends. A suitable lock 39 having elongated legs can be inserted through the aligned apertures 38 to secure an attachment member 16 within the slot 36a. It is to be understood that any type of locking device can be provided for use with this invention for releasably securing any of the attachment members 16 with the lockable securing device 17. For example, a tumbler lock fitting in a bore in arm 23b has a pin extending across the slot into the bore in arm 23c. The whole lock and pin is removable to open the slot for bicycle removal.

In another embodiment of the present invention, an arrangement is provided for securing the front and rear wheels 43, 42 of the bicycle 10 to the lockable securing device 17.

In this embodiment, an elongated retaining rod 40 for securing the rear wheel 42 is provided having a hook or U-shaped portion 44 formed at one end and a bent portion 45 and deformed portion 46 formed at the opposite end. An additional slightly bent portion 47 ahead of the portion 45 can be provided to allow the end of the rod to align itself parallel with the top of the locking device 17. The bent end portion 45 is bent downwardly at approximately a 90° angle. The deformed end 46 can be formed in any way desired such as by bending again at a right angle or forging or peening to form a flange or knob to prevent the rod end from being moved upwardly through the slot 36*b*.

A second retaining rod 41 for securing the front wheel 43 of the bicycle is provided having a hook or U-shaped portion 48 formed at one end and a deformed portion 49 formed at the opposite end. The deformed portion 49 can be formed in a similar manner as described for the rod 40. As can be seen in the drawings, the length of the retaining rod 41 is considerably shorter than the rod 40.

Figure 10:
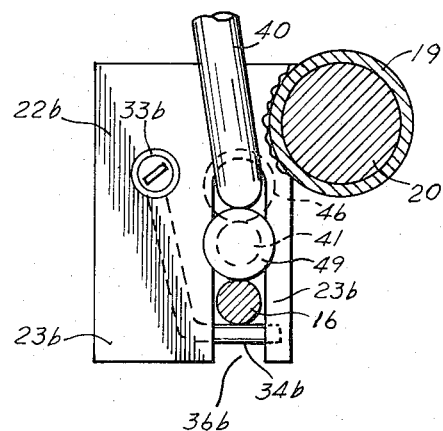
FIG. 10 is a top view of the wheel locking embodiment of a bicycle attached locking device showing the lockable latch mechanism securing the support rack attachment loop and the front and rear wheel securing rods.

To secure the wheels as provided in this embodiment, the lockable securing device 17 which is fixedly attached to the frame bearing housing 19 includes a body 22*b* having outwardly extending spaced arms 23*b* forming the slot 36*b*. A locking device is provided similar to the arrangement described above, such as the tumbler lock 33*b* and the latch 34*b* (See FIG. 10).

In use, the hook portion 44 of the rod 40 is inserted around the rim and tire of the rear wheel 42 and moved forward so that the bent end portion 45 engages the end of the slot 36*b*. The rod 40 is then moved rearwardly so that the end portion 45 is positioned at the base of the slot 36*b*. The hook portion 48 of the rod 41 is then inserted around the tire and rim of the front wheel 43 at a position below the locking device 17 and the body of the rod is inserted into the slot 36*b* with the deformed end 49 positioned at the top of the locking device 17. The bicycle 10 and the locking device 17 are then positioned with an attaching member 16 inserted into the slot 36*b* and the slot is closed with a locking device. In this way, not only the frame of the bicycle is secured, but also the front and rear wheels are retained to prevent their unauthorized removal.

The deformed ends 46, 49 of the rods 40, 41, respectively, prevent the rods from being moved upwardly or downwardly out of the slot 36*b*. The length of the rod 40 and the hook or bent portion 44 must be sufficient to allow the bent portion 45 to be inserted into the front end of the slot 36*b* and then moved to the rear of the slot. It is to be understood that the depth of the slot 36*b* is to be arranged to accommodate the desired number of members to be secured therebetween.

Figure 11:
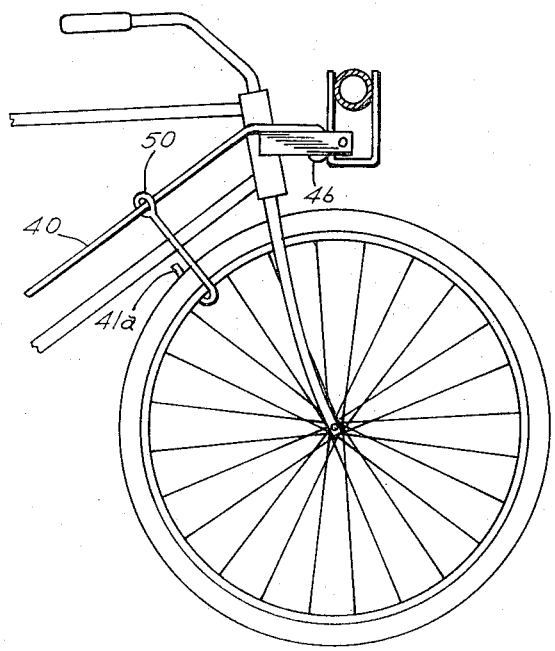
FIG. 11 is a partial side view of another embodiment of the wheel securing rod device with the front wheel rod attached to the body of the rear wheel securing rod.

Another variation of this embodiment is shown in FIG. 11, the front wheel retaining rod 41*a* is shown to have a closed loop 50 provided at the deformed end. The loop 50 is inserted over the body of the rod 40 forming a slidable and pivotal attachment. In use, the rear supporting rod 40 is engaged with the rear wheel 42 and the hook 41*a* is inserted over the front wheel 43 prior to the insertion of the bent end 45 of the rod being inserted within the slot 36*b*.

A clip 51 can be provided on the bicycle frame below the seat to hold the rods 40 and 41 while the bicycle is being used. Thus, a novel arrangement is provided not only for securing the frame of the bicycle to an anchored immovable object, but the securing of the front and rear wheels of the bicycle to the frame to also prevent their removal.

The bicycle may be locked by the use of the rods 40 and 41, secured to the wheels and having an end mounted in the housing 22. The rods may be locked in the housing without any other ring or rod and provide a locked bicycle which is not attached to any object.

While a locking device for bicycles has been shown and described in detail, it is obvious that this invention is not to be considered as being limited to the exact form disclosed and that changes in detail and construction may be made therein within the scope of the invention without departing from the spirit thereof.

I claim:

1. A bicycle locking device for securing a bicycle having a front and a rear wheel to a thin anchored object comprising:
    a. a body having a pair of outwardly extending arms spaced from each other to form an open ended slot therebetween, said body being fixedly attached to a portion of the frame of the bicycle to be secured,
    b. means for securing the wheels of said bicycle to said body,
    c. said body slot being sized to receive said wheel securing means and said anchored object, and
    d. locking means for releasably closing the end of said slot to retain said wheel securing means and said anchored object when inserted therein, whereby said bicycle and wheels can be secured to prevent unauthorized removal.

2. A bicycle locking device as defined in claim 1 wherein
    said wheel securing means includes a pair of retaining rods, said rods each having a hook portion formed at one end and a deformed portion formed at the opposite end, each of said rods being arranged whereby the hook portion is inserted around a rim of a wheel of the bicycle and the deformed portion is inserted through said slot to secure said wheels so that said rods are retained by said locking means.

3. A bicycle locking device as defined in claim 1 wherein
    said wheel securing means includes a first and a second retaining rod, each of said rods having a hook portion formed at one end and a deformed portion formed at the opposite end,
    said first rod being of sufficient length to permit the hook portion to be positioned around the rims of the rear wheel and the deformed end portion to be inserted into the slot of said body whereby the rod can be retained by the locking means, and
    the deformed portion of said second rod is a closed loop formed around said first rod, said second rod having sufficient length whereby the hook portion is inserted around the rim of the front wheel and is held secure when the first rod is retained within the slot of the body.

4. A bicycle locking device for securing a bicycle having front and rear wheels comprising
    a. a thin object secured to a rigid, anchored member,
    b. a body having a pair of outwardly extending parallel arms spaced from each other to form a slot, said body being fixedly attached to a portion of the frame of the bicycle to be secured so that the slot between the spaced arms may receive a portion of the anchored object therebetween,
    c. means for securing the wheels of said bicycle to the body so that the wheels can not be removed from the secured bicycle, and
    d. locking means for releasably enclosing said anchored object and said wheel securing means within said body slot whereby said bicycle can be secured to said rigid member to prevent unauthorized removal.

5. A bicycle locking device as defined in claim 4 wherein
said thin object is an endless loop formed from a flexible material.

* * * * *